July 13, 1926.

R. M. LOVEJOY 1,592,373

SHOCK ABSORBER

Filed May 31, 1924    4 Sheets-Sheet 1

INVENTOR—
RALPH M. LOVEJOY
BY Heard Smith Tennant
ATTORNEYS.

July 13, 1926.

R. M. LOVEJOY

SHOCK ABSORBER

Filed May 31, 1924

INVENTOR—
RALPH M. LOVEJOY-
BY
ATTORNEYS—

Patented July 13, 1926.

1,592,373

UNITED STATES PATENT OFFICE.

RALPH M. LOVEJOY, OF BOSTON, MASSACHUSETTS.

SHOCK ABSORBER.

Application filed May 31, 1924. Serial No. 716,892.

This invention relates broadly to improvements in fluid pressure relief devices and the object thereof is to provide a relief device for a chamber containing a fluid subject to variations in pressure comprising a port having a yieldable relief valve and means operable in response to increase in pressure in the fluid-containing chamber to force the valve toward closed position. This preferably is accomplished by providing means for causing an increase in pressure in the fluid-containing chamber to build up a back pressure upon the valve which will urge it toward its seat in correlation to the increase in pressure in the fluid-containing chamber.

More particularly the invention relates to improvements in shock absorbers and the general object of the invention thus applied is to provide a shock absorber which will gradually cushion the relative movement of the members which act upon the shock absorbing device. Usual types of hydraulic shock absorbers comprise a casing which is attached to one of two relatively movable members and which is provided with a chamber, usually in the form of a cylinder having a partition or piston reciprocable therein, said partition or piston being connected to the other relatively movable member. The chamber or cylinder is provided with a suitable inlet through which the fluid may flow freely into the chamber or cylinder upon the suction movement of the partition or piston and is also provided with a relief port having a spring-actuated valve which restricts the flow of fluid from the chamber or cylinder upon the compressive movement of the piston. In such constructions the valve spring is usually of such strength as to require a considerable increase of pressure upon the fluid in the chamber or cylinder to open the valve before a restricted amount of fluid can flow from the chamber to permit a compressive movement of the partition or piston. Thus a shock of more or less intensity is produced by such resistance to the initial flow of fluid from the cylinder.

One of the principal objects of the present invention is to provide a relief valve construction in which the valve will readily yield to produce a minimum amount of resistance to a sudden movement of the piston, such as the initial movement thereof, but will progressively urge the valve toward closed position in correlation to the increase in pressure caused by further compressive movement of the piston or partition so that the initial shocks heretofore experienced will be avoided and the relatively movable members of the shock absorber will be caused gradually to return to normal position.

A further object of the invention is to provide a relief valve for shock absorbers comprising a spring-actuated valve with means operable by increase in pressure in the fluid-containing chamber for compressing the valve spring with a force correlated to the increase in pressure in the fluid-containing chamber until a predetermined pressure is attained and which will thereafter maintain a constant pressure upon the valve spring which will enable the valve spring to yield in response to further increase in pressure in the fluid-containing chamber.

A further object of the invention is to provide a construction in which the fluid pressure in the chamber will again act upon the valve with increasing force after the valve spring has been compressed to its limit or to a predetermined degree and thereby further restrict the flow of fluid from the cylinder or chamber in response to pressures exceeding that for which the valve spring is designed to function.

Another object of the invention is to provide a construction in which the operation of the relief valve is rendered noiseless, the construction being such that hammering is avoided and the hissing of fluid passing through the ports eliminated.

A further object of the invention is to provide a shock absorber comprising a plurality of valves located at different distances from the end of the cylinder or fluid-containing chamber for cushioning the descent of the piston with means operable upon compressive movement of the piston or partition a predetermined distance to close the port of the valve which is more remote from the end of the cylinder thereby causing the valve or valves which are closer to the end of the cylinder to act alone to restrict the flow of fluid from the cylinder. In such construction preferably the relief valve which is more remote from the end of the cylinder is actuated by a lighter spring or springs and yields readily to relatively short movements of the piston or partition to cushion lighter shocks, while the valve or valves which are located more nearly in proximity to the end of the cylinder are provided with heavier springs designed to restrict the flow of fluid from the cylinder or fluid-containing chamber upon greater movements of the piston caused by heavier shocks.

A further object of the invention is to provide a relief valve for a shock absorber with multiple springs of progressively increasing strength and progressively decreasing lengths so arranged that the lighter spring will yield in response to relatively light shocks and the resistance of the heavier springs will be imposed progressively to cause the valve to resist and restrict the flow of fluid from the cylinder or chamber produced by heavier shocks.

Another feature of the invention consists in providing means for preventing the accumulation of sediment in the passage leading from the cylinder or fluid pressure chamber to the valve chamber which otherwise might interfere with the flow of the fluid and prevent the proper functioning of the valve.

Other objects and features of the invention will more fully appear from the following description and the accompanying drawings and will be particularly pointed out in the claims.

Various illustrative embodiments of the invention are shown in the accompanying drawings, in which—

Preferred embodiments of the invention are disclosed herein as applied to shock absorbers for cushioning the movement of two relatively movable members in which the fluid-containing chamber is in the form of a cylinder having a piston reciprocable therein with an inlet to permit the fluid to flow freely into the cylinder upon the suction movement of the piston and a relief port having means to restrict the flow of fluid from the cylinder during the compressive movement of the piston. The invention, however, in its broader aspects may be embodied in any device comprising a chamber containing a fluid which is subject to variations in pressure and particularly to any device or mechanism comprising a fluid-containing chamber having a movable partition therein which is subject to pressure and is provided with a movable partition by or through which the pressure upon the fluid within the chamber is varied with an effect similar to that of the piston. The term "piston", therefore, is used in the present specification in a broad sense to include either a piston having a rectilinear reciprocating movement, a circular or oscillating movement, or a flexible movement such for example as that of a diaphragm.

The term "fluid" is used herein to include either gaseous or liquid fluid.

With the above understanding of the scope of the invention as defined by the claims the particular embodiment of the invention as applied to shock absorbers will now be described.

The invention is shown herein as applied to a shock absorber of the general type disclosed in Letters Patent of the United States No. 1,324,913 granted to me December 16, 1919. The shock absorber comprises a casing 1, preferably having laterally extending ears 2 adapted to be secured by suitable bolts 3 to one of the relatively movable members, such as the frame of a vehicle. The casing is provided with an interior cylindrical wall or partition 4 providing a cylinder 5 and a reservoir 6 for the fluid which preferably is a liquid such as oil of a proper consistency. A preferably tubular piston 7 is reciprocably mounted in the cylinder 5 and its head 8 is pivotally connected to one end of a link 9, the other end of which is pivotally connected to an arm 10 which is fixedly secured by a screw threaded stud 11 to a rock shaft 12 which is journalled in suitable bearings in the casing and is provided upon the outside of the shock absorber casing with an arm 13 having a flexible connection such as a strap or rope 14 to the other relatively movable member such as the axle of a vehicle.

Means are provided for permitting a substantially free flow of the fluid from the reservoir into the cylinder upon the suction movement of the piston. The particular means illustrated comprises a valve seat 15 which is seated upon the head 16 of the cylinder and provided with a port 17 having a valve 18 normally pressed lightly toward its seat by a helical spring 19 surrounding a stud 20 which is secured at its lower end to a spider of the valve seat, one end of the spring 19 engaging the valve 18, and the other a suitable abutment such as a collar surrounding the stud 20 and held against the spring by suitable means such as a cotter pin 21. The valve seat 15 is held in position by a spring 22 the lower end of which bears upon a flange upon the valve seat and the upper end of which engages the under face of the piston head. Thus the spring 22 performs the double function of retaining the valve seat in position and yieldably holding the piston in normal position, that is the position which it assumes when the relatively movable members are in their normal positions.

In the constructions illustrated in Figs. 1, 4, 5, 7 and 12 of the drawings the cylinder is provided with a thickened wall portion 23 having a plurality of relief ports 24 and 25 leading from the cylinder to the reservoir, the flow of fluid through such ports upon the compressive movement of the piston being restricted by valves which are yieldable upon increase of pressure upon the fluid within the cylinder.

Figures 1, 2, 3:
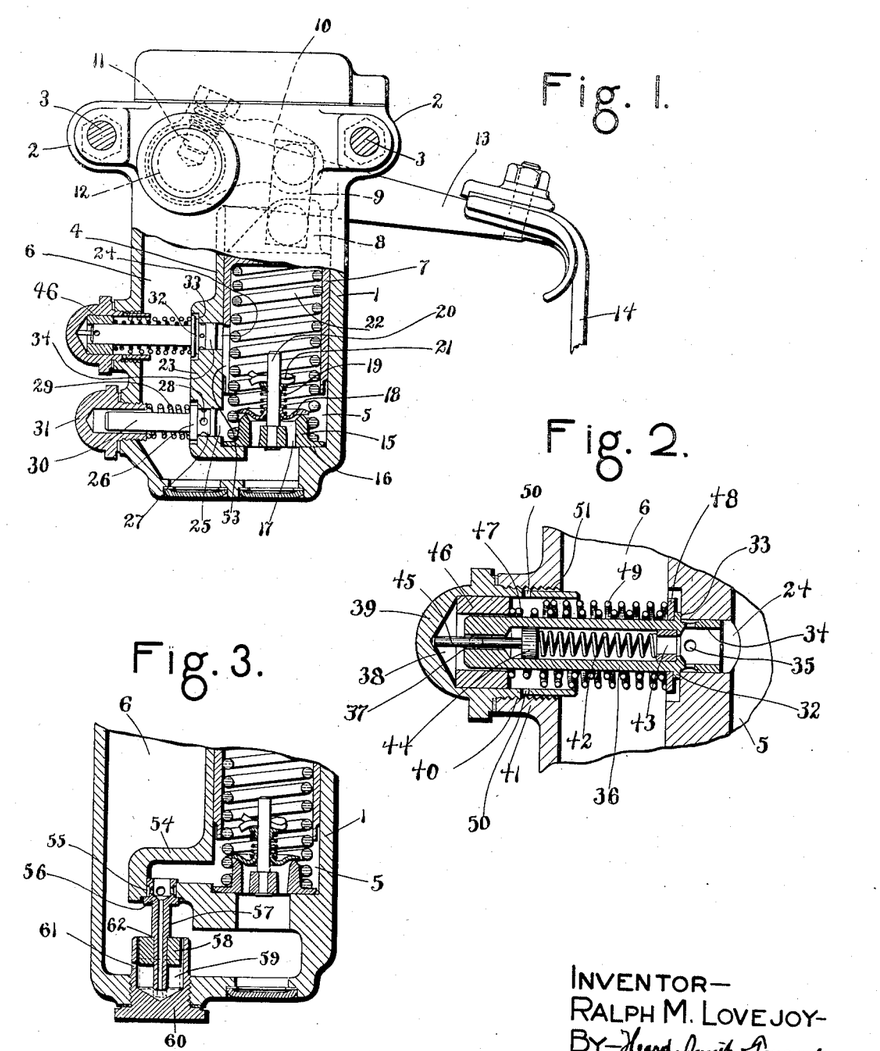
Fig. 1 is a view of a shock absorber, partially in vertical longitudinal section, illustrating a preferred embodiment of the invention and comprising a plurality of relief devices.
Fig. 2 is an enlarged detail view, in vertical section, of one of the relief devices illustrated in Fig. 1.
Fig. 3 is an enlarged detail view of a modified form of the invention.

In the construction illustrated in Fig. 1 the lower valve 26 is provided with a tubular extension 27 which is telescopically mounted in the lower port 25 and is provided with apertures 28 adapted to discharge a restricted amount of fluid from the cylinder into the reservoir when the valve is forced from its seat by increase of pressure within the cylinder. The valve is normally held in closed position by a helical spring 29 which surrounds the valve stem 30 and abuts at one end against the valve 26 and at the other end against the end of a screw threaded hollow plug 31 which is seated in the wall of the casing. The chamber of the plug 31 is slightly larger than the valve stem in order to permit the fluid to flow into and out of the chamber upon reciprocation of the valve stem 30.

The construction thus described may be and preferably is similar to that disclosed in my prior patent aforesaid.

In the construction illustrated in Fig. 1 the relief device, which forms an important part of the present invention, is illustrated as controlling the upper port 24 and comprises a valve 32 having an annular shouldered portion adapted to engage a seat 33 surrounding the port and provided with a tubular extension 34 having lateral apertures 35 to permit a restricted discharge of the fluid upon displacement of the valve by the pressure of the fluid within the cylinder. The valve is provided with a tubular stem 36 communicating at one end with the tubular extension 34 of the valve and at its other end having a relatively narrow passage 37 leading to a valve chamber 38 which as illustrated is formed within a tubular plug 39 having an externally screw threaded wall 40 which engages complementary screw threads in a boss 41 in the wall of the casing.

Means are provided for normally urging the valve toward seated position, a convenient means comprising one or more helical springs which act upon the valve.

In order more effectively to control the action of the valve in response to progressive increase in pressure, as will hereinafter be more fully defined, a multiple valve spring is provided which as illustrated comprises a relatively light spring 42 which is located within the valve stem 36 and is seated at one end upon a collar 43 which is secured in said stem adjacent to the end of the valve 32 and at its other end engages the enlarged head 44 of a clearing rod 45 which is reciprocably mounted in the narrow passage 37 in the outer end of the valve stem which leads to the chamber 38. The end of the rod 45 abuts against the wall of the valve chamber and its head 44 forms a seat for the spring which causes the spring to urge the valve toward seated position. As the valve and its stem reciprocate, relative movement between the valve stem and the rod 45 prevents the accumulation of débris within the narrow passage 37 through which the fluid flows from the cylinder into the valve chamber.

A plunger 46 slidably mounted in the valve chamber 38 surrounds the valve stem 36 with a slight clearance therebetween and engages the outer end of a helical spring 47 which surrounds the valve stem, the inner end of which spring abuts against a collar 48 which is seated against the head of the valve 32. One or more additional springs 49, surrounding the valve stem, may be employed, such springs desirably being of progressively shorter length and adapted to be engaged by the plunger as it is forced inwardly so that they will progressively add their resistance to the movement of the valve upon predetermined movements thereof.

Where two or more springs of this character are employed they are desirably wound in opposite directions to prevent jamming. By employing a multiplicity of springs a more delicate regulation of the movement of the valve is attained.

The wall of the valve chamber 38 is provided with ports 50 which desirably communicate with a recess leading to the reservoir preferably formed by reducing the outer diameter of the inwardly projecting wall of the valve chamber 38 by cutting away the screw threads on said wall so that the fluid which is forced through the port 50 will engage the serrated threaded surface of the casing and will be baffled in such a manner as to prevent the hissing of the fluid as it passes through the port and slot.

In the operation of the relief valve construction a slight compressive movement of the piston will unseat the valve against the pressure of the relatively light spring 42 and permit the fluid to flow from the cylinder into the reservoir. At the same time the fluid is forced through the narrow aperture 37 in the piston stem into the valve chamber and builds up a back pressure against the end of the valve stem and also against the end of the plunger so that the valve is urged toward closed position both by the pressure against the end of the valve stem and also by the pressure against the plunger. As the fluid pressure in the cylinder is increased by further compressive movement of the piston the plunger 46 will be forced inwardly until its outer end reaches or passes the ports 50 at which time the fluid will flow from the valve chamber through the ports 50 and recess 51 into the reservoir and maintain a constant pressure in the valve chamber, after which the valve may yield further against the resistance of its springs. If more fluid is forced into the valve chamber than can escape through the clearance around the valve stem and through the ports 50 and recess 51 further pressure will be built up in the valve chamber which will again urge the valve more forcefully toward seated position.

The tubular piston 7 is provided with an aperture or slot 53 of such length and area to establish communication with both the upper and lower ports 24 and 25 when the piston is in normal position. The aperture or slot, however, is so constructed that upon the compressive movement of the piston a predetermined distance, communication between the cylinder 5 and the port 24 will be closed and upon further compressive movement of the piston the escape of fluid from the cylinder will be subject to the restriction of the lower valve only.

In the particular construction illustrated in Fig. 1 the lower valve spring 29 desirably is of greater strength than that of the upper valve springs and during the operation of the shock absorber is effective to cushion the heavier shocks, while the lighter shocks caused by the relatively shorter movements of the piston are dissipated by the action of the upper relief valve.

It will, however, be understood from the further description of the operation of the relief valve mechanism disclosed herein and which is illustrated as applied to the upper valve in Fig. 1 that the spring-actuated valves illustrated may be reversed in position, or that a single valve embodying the invention may be employed, or that such other number of valves may be used as may be required properly to control pistons having different lengths of movements or involving different conditions of fluid pressure.

The operation of the novel relief valve comprising the present invention, which is illustrated herein as the upper relief valve, may be described as follows when employed upon a shock absorber for cushioning the relative movement between the body of a vehicle and its axle.

When the wheels of a vehicle engage an obstruction on the road the axle is raised thereby compressing the springs of the vehicle. Thus the relatively movable axle and frame are caused to approach each other and the piston is raised by its spring 22, thus producing a suction movement which draws oil from the reservoir through the inlet into the cylinder until the limit of such movement is reached. The valve 18 then closes, trapping the oil in the cylinder. Upon the rebound the arm 13 is drawn downwardly as the relatively movable axle and frame begins again to separate under the action of the vehicle spring, thus producing a compressive movement of the piston and increasing the pressure of the fluid within the cylinder 5. The valve 32 which is either held lightly against its seat or in proximity to the seat yields readily to such increase in pressure and permits the fluid to flow from the cylinder into the reservoir. At the same time the fluid is forced from the cylinder through the barrel of the tubular valve stem into the valve chamber 38, thereupon building up a back pressure upon the valve stem and plunger 46, causing them to compress the valve spring with a force which is correlated to the fluid pressure in the cylinder. This increase in pressure in the valve chamber, therefore, urges the valve toward its seat and progressively restricts the flow of fluid through the port 24, thus gradually but effectively causing the piston to assume its normal position.

Where a multiple spring is used the resistance of the valve is increased in accordance with the resistance which is progressively imposed by the successive springs. Thus the lighter shocks may be dissipated by the action of the novel valve alone, or may be supplemented by the action of another valve either of a similar type or that heretofore disclosed in my prior patent. If the back pressure upon the plunger 46 is sufficient to force the valve 46 beyond the aperture 50 the fluid pressure in the valve chamber will be sufficient to prevent further movement of the plunger 46 and a substantially constant back pressure will be maintained upon the plunger 46. Under such circumstances the valve may yield against the resistance of its spring to further increase of fluid pressure in the cylinder until a predetermined resistance of the valve springs is attained, or the springs have reached their limit of compression. Further increase in fluid pressure in the cylinder will then again act upon the plunger to force it still further and thus urge the valve more forcefully toward its seat.

By reason of this construction, therefore, four stages of operation are provided. First, the valve is permitted to yield freely upon sudden compressive movement of the piston, such as the initial compressive movement thereof, which will prevent any shock being experienced by the occupants of the vehicle. Thereafter the movement of the plunger by the back pressure produced in the valve chamber will urge the valve toward seated position with progressively increasing force correlated to the pressure in the cylinder until a predetermined pressure is attained, whereupon a substantially constant back pressure upon the valve spring will be maintained. The valve will next yield to further increase in pressure until a predetermined resistance is offered and thereafter a still further back pressure will be imposed upon the valve by further movement of the plunger.

In the construction illustrated in Fig. 1 the slot or aperture in the wall of the piston is of such length that after the piston is moved a predetermined distance in its compressive movement upon the fluid in the cylinder the port 24 will be gradually closed until finally the effective action of the valve 32 will be eliminated and the escape of fluid from the cylinder during the final compressive movement of the piston will be restricted by the action of the lower relief valve which may be actuated by a relatively heavy spring adapted to respond only to greater movements of the piston caused by more intense shocks.

By providing a multiple spring numerous advantages may be attained. First, the spring, which normally urges the valve toward its seat, may be very light so that the valve may be retained in seated position or in proximity thereto and will yield readily to very light shocks. Second, by providing springs of progressively increasing length adapted to be engaged by the plunger upon progressive movement thereof a delicate regulation of the flow of fluid from the cylinder may be attained, and third, the use of multiple springs avoids crystallization which is likely to occur when a single spring is employed.

It will be understood that the novel relief valve construction may be employed alone or in connection with one or more other relief valves of a similar nature, or with other types of relief valves within the spirit and scope of the invention as defined by the claims herein.

In Fig. 3 a modified construction is disclosed in which the plunger acts directly upon the valve without the interposition of any valve spring. In this construction the casing 1 is provided with a laterally extending boss 54 provided with a downwardly extending port 55. A tubular valve 56 is telescopically mounted in the port 55 and is provided with a tubular stem 57 upon which a plunger 58 is reciprocably mounted in a preferably cylindrical valve chamber 59 formed in a screw threaded plug 60 which is seated in the lower wall of the casing 1. The wall of the valve chamber is provided with a port 61 which is controlled by the movement of the plunger 58 as above described. A shoulder 62 is provided upon the tubular valve stem 57 which is engaged by the plunger when a back pressure is built up within the valve chamber 59 and the valve is thereby urged toward closed position by further movement of the plunger.

In the construction illustrated in Fig. 3 the valve is shown in seated position with a sufficient back pressure in the chamber 59 to force the plunger 58 beyond the aperture or port 61 in the valve chamber, thereby urging the valve toward closed position with a substantially constant force. Upon reduction of pressure in the cylinder the back pressure in the valve chamber 59 may decrease until the plunger 58 falls by gravity into the dotted line position illustrated and the valve will be permitted to drop until the end of the valve stem engages the lower end of the valve chamber.

The operation of the device as disclosed in this embodiment of the invention, therefore, is similar to that previously described with respect to Figs. 1 and 2 in that the valve normally remains in unseated position and permits a relatively free flow of fluid from the cylinder during a quick compressive movement of the piston, such as the initial movement thereof, but immediately thereupon the fluid is forced through the tubular valve stem and builds up the back pressure upon the plunger 58 which urges the valve toward closed position with a force correlated to the increase in fluid pressure in the cylinder until a predetermined pressure is attained after which a substantially constant pressure is maintained upon the valve until the pressure in the valve chamber, which is transmitted from the fluid chamber, is so great that a sufficient amount of fluid cannot escape through the port 61 to maintain such constant pressure, so that further increase of pressure will again cause the plunger further to urge the valve toward closed position and thereby further restrict the flow of fluid from the cylinder.

Figures 4, 5, 6:
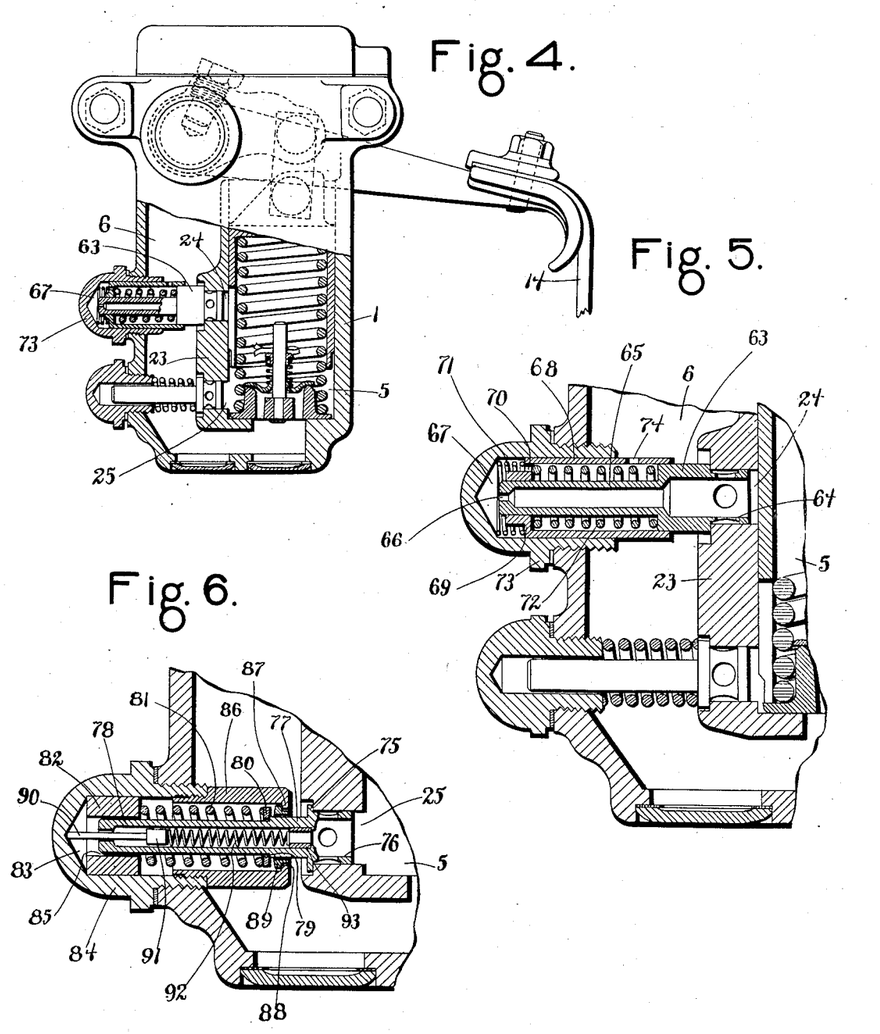
Fig. 4 is a view of a shock absorber, partially in vertical section, showing another embodiment of the invention and also illustrating a plurality of relief devices.
Fig. 5 is an enlarged detail view, mainly in vertical section, of the relief mechanism illustrated in Fig. 4.
Fig. 6 is an enlarged detail view of a different form of relief device which is illustrated in vertical section and as applied adjacent the end of the cylinder.

The embodiment of the invention illustrated in Figs. 4 and 5 differs mainly from that illustrated in Fig. 1 in the form of the valve and valve chamber. The casing containing the cylinder, the reservoir, the tubular piston and the lower relief valve are the same as those shown in Fig. 1. The upper relief valve comprises a cylindrical portion 63 from which a tubular extension 64 provided with lateral ports extends into the port 24 in the manner heretofore described. The cylindrical portion 63 is integral with the tubular stem 65 of the valve which is provided at its outer end with a narrow aperture 66 communicating with a valve chamber 67. The plunger or plunger valve in this construction is in the form of a sleeve 68 which is slidably mounted at the inner end upon the cylindrical portion 63 of the piston and at its outer end provided with a head 69 which fits upon the tubular stem 65 and is provided with one or more small apertures 70 which establish communication between the valve chamber and the reservoir to permit a sufficient flow of fluid therethrough to avoid breakage of the walls of the valve chamber when fluid is forced suddenly into the valve chamber under high pressure. A light spring 71 is interposed between the head 69 of the plunger and the end wall of the valve chamber and acts normally to hold the valve lightly seated or in proximity to its seat. A helical valve spring 72, surrounding the valve stem, is interposed between the head 69 of the plunger and the shouldered outer end of the cylindrical portion 63 of the valve.

The plunger 68 is reciprocably mounted within the valve chamber which is located within the screw threaded plug 73 as in the construction heretofore described. An aperture or port 74 is located in the cylindrical plunger wall a short distance from the outer end of the cylindrical portion 63 of the valve.

The operation of the device is substantially identical with that heretofore described. A sudden increase of pressure in the cylinder first unseats the valve so that a sufficient amount of fluid flows through the port 24 to avoid a sudden checking of the descent of the piston. The fluid, however, which is forced through the tubular valve stem builds up a back pressure in the valve chamber 67 and forces the plunger inwardly thus compressing the valve spring 72 with a force correlated to the increase in fluid pressure in the cylinder. The valve spring is thus compressed until the port 74 in the cylindrical plunger passes beyond the outer shoulder of the valve 63 whereupon the escape of fluid from the valve chamber is prevented and a more rapidly increased pressure is imposed upon the valve spring which more forcefully resists further movement of the piston. Under certain conditions relief valves of this character are very effective and rapidly bring the piston to its neutral position.

In the construction illustrated in Fig. 6 a different form of relief device is shown. In this construction the valve 75 is provided with a tubular portion 76 which is telescopically mounted in the relief port 24. A tubular valve stem 77 extends outwardly from the valve and is provided with a portion 78 of reduced diameter which presents a shoulder 79 at its junction with the portion 77 of the valve stem. A collar 80, surrounding the reduced portion of the valve stem, abuts against the shoulder 79 and the valve spring 81 engages at one end against the collar and at its opposite end against a plunger 82 which is reciprocably mounted in a valve chamber 83 formed in the plug 84 which is seated in the casing. The plunger 82 is slidably mounted upon the reduced portion 78 of the valve stem and the aperture, which receives the valve stem, is of slightly greater diameter than the valve stem to provide a passage 85 which will permit a limited escape of the fluid from the outer end of the valve chamber.

In this construction the valve chamber is extended by a sleeve 86 which preferably is screwed to the inner end of the plug and provided at its inner end with an inwardly extending annular flange 87 which provides a port 88 leading to the reservoir. An annular valve 89 is reciprocably mounted upon the larger portion 77 of the valve stem and is adapted to reciprocate between the collar 80 and the flange 87, the valve 89 being adapted to close the port 88 upon its inward movement, except for a narrow clearance around the valve stem.

In this construction means are provided for preventing accumulation in the relatively narrow outlet of the passage leading from the hollow valve stem to the valve chamber. This is accomplished by providing a rod 90 which is reciprocably mounted in the aperture in the end of the valve stem and is provided with a cross head 91 which is engaged by one end of a spring 92, the other end of which is seated upon a sleeve 93 preferably located adjacent the inner end of the tubular valve stem so that the reciprocation of the valve stem will cause the rod 90 to abut against the end wall of the valve chamber and by its movement backward and forward through the aperture in the valve stem prevent the accumulation of débris which would interfere with the flow of the fluid from the cylinder into the valve chamber.

In this construction, as those heretofore described, a sudden movement of the piston will force the valve away from seated position against the action of the valve spring 81, but the passage of fluid under pressure through the hollow valve stem will build up a back pressure behind the plunger 82 thus forcing the plunger forward and compressing the valve spring. The forward movement of the plunger together with the passage of the restricted amount of the fluid through the passage 85 will seat the valve 89 so that fluid pressure will be built up in the chamber within the sleeve 86 which under certain conditions will equal the back pressure of the fluid in the valve chamber 83 upon the plunger and thereby arrest further movement of the plunger. Under such conditions the valve 77 will yield against the action of its spring to further increase in fluid pressure in the cylinder. When the fluid pressure in the cylinder is relieved and the piston approaches normal position the valve 89 will open and permit liquid from the reservoir quickly to fill the chamber within the sleeve 86 so that the device will function rapidly upon successive shocks.

Figures 7, 8, 9, 10, 11:
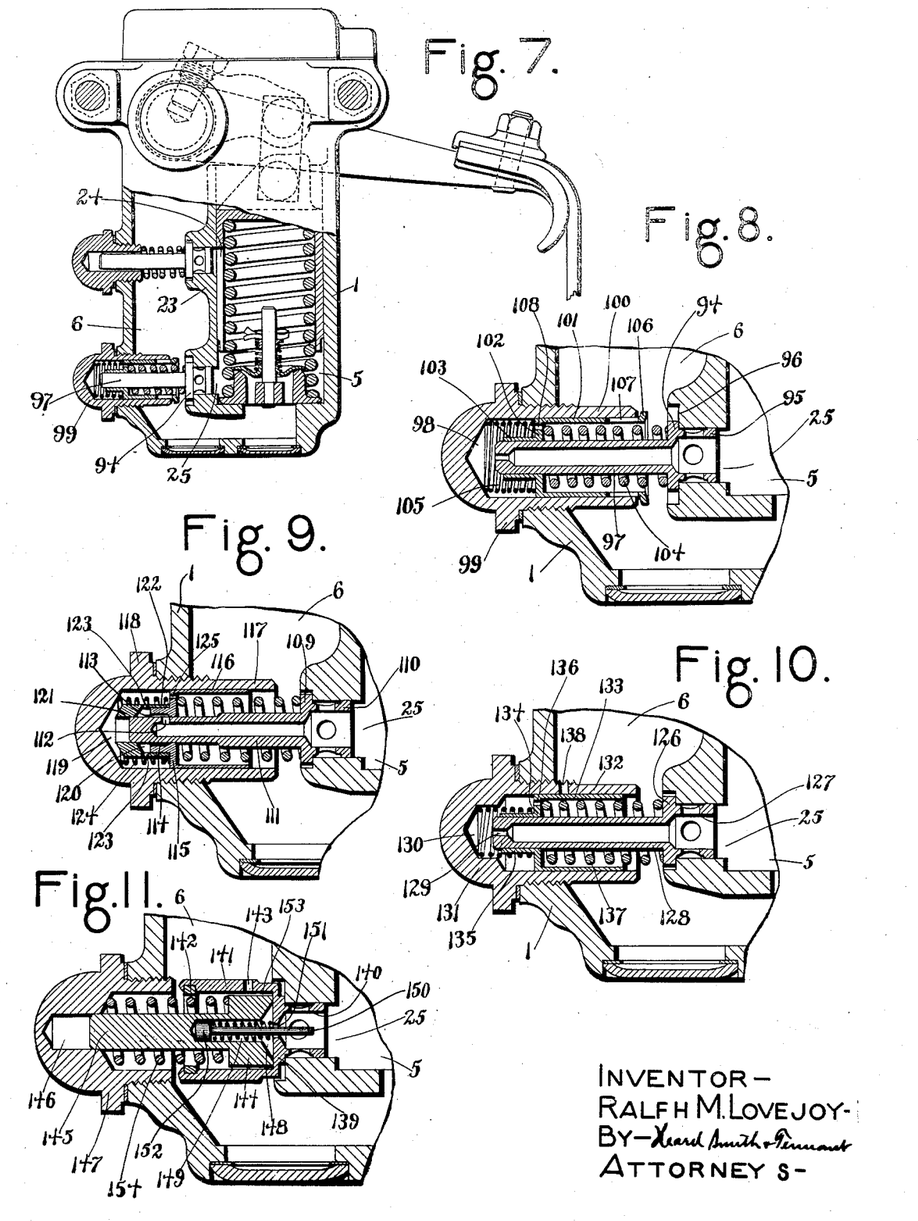
Fig. 7 is a view, partially in vertical section, of a shock absorber, illustrating other forms and arrangements of a plurality of relief devices.
Fig. 8 is an enlarged detail view showing the form of relief device illustrated in Fig. 7 located adjacent to the end of the cylinder.
Fig. 9 is an enlarged detail view, in vertical section, showing a relief device of somewhat more complicated construction.
Fig. 10 is an enlarged detail view, in vertical section, showing a different form of relief device embodying the invention.
Fig. 11 is an enlarged detail view showing a radically different embodiment of the invention; and, Fig. 12 is a longitudinal sectional view of a double-acting shock absorber designed to cushion the movement of the relatively movable members in each direction.

In the construction illustrated in Figs. 7 and 8 the usual type of valve disclosed in my prior patent is illustrated as applied to the upper port 24 leading from the cylinder to the reservoir, while a valve embodying the invention is applied to the lower port. In the particular construction illustrated in Figs. 7 and 8 the valve 94 is provided with a tubular extension 95 which is telescopically mounted in the port 25 and is provided with the usual apertures to permit the flow of fluid therethrough when the valve is compressed away from its seat. In this construction an enlarged valve seat 96 surrounds the head of the valve and the valve is provided with a tubular stem 97 having a relatively narrow outlet leading to the valve chamber 98 which, as in other constructions, is located in the plug 99 which is secured in the casing 1. In this construction the plug 99 is provided with an extended cylindrical wall 100. The plunger is in the form of a sleeve 101 having a head 102 provided with an extension 103 which slidably fits upon the valve stem 97. A helical spring 104 is interposed between the head of the valve 94 and the head 102 of the plunger and a light spring 105 is interposed between the head of the plunger and the end wall of the valve chamber and serves to urge the valve normally toward seated position. In this construction the plunger is provided with a preferably annular enlarged and cupped flange 106 which is adapted to seat upon maximum movement of the plunger upon the enlarged valve seat 96. The plunger sleeve is provided with an aperture 107 adjacent to the flanged end portion 106 which, upon movement of the valve toward seated position, communicates with the space between the end of the plug extension 100 and the valve seat. The head of the plunger is provided with an aperture 108 to permit a restricted amount of fluid to flow from the valve chamber into the tubular portion of the plunger.

In the operation of this device a quick increase in pressure such as is produced by the initial compressive movement of the piston unseats the valve 94 and permits the fluid to flow from the cylinder into the reservoir. At the same time the fluid under pressure from the cylinder is forced through the valve stem into the valve chamber and builds up a back pressure behind the plunger which forces the plunger inwardly, thus compressing the valve spring with a force correlated to the increase in pressure in the cylinder. During the movement of the plunger a portion of the fluid flows through the valve chamber through the port 108 and when the annular flange 106 is seated against the shoulder 96 permits a sufficient flow of fluid from the valve chamber through the plunger to maintain a substantially constant pressure upon the valve spring after which the valve yields in response to further increase in pressure against the resistance of its spring, thus restricting the flow of fluid through the port 24 in such a manner as to cause the piston rapidly to resume normal position.

In the construction illustrated in Fig. 9 the valve 109 is provided with a tubular extension 110 telescopically mounted in the relief port 25 and provided with lateral apertures as heretofore described and has a tubular valve stem 111 which, however, is closed at its outer end, but provided adjacent its end with a laterally extending port 112 which communicates with an annular recess 113 in an extension 114 of the head 115 of a cylindrical plunger 116 which is slidably mounted in a cylindrical extension 117 of the hollow plug 118 which forms the valve chamber 119. In this construction the annular recess 113 communicates with an annular channel 120 which is provided by a collar 121 which is located at a distance from the end of the extension 114 and slidably fits upon the closed end of the valve stem. The collar 121 is provided with an integral sleeve 122 which is fixedly secured to the extension 114 of the plunger head. Ports 123 lead from the channel 120 to the valve chamber 119. A light spring 124 is interposed between the head 115 of the plunger and the end wall of the valve chamber 119 and maintains the valve lightly seated or in proximity to seated position.

In the operation of this device a sudden increase in pressure, such as the initial compressive movement of the piston, in the cylinder will force the valve from its seat thereby permitting a relatively free flow of the fluid during such sudden movement, but the fluid passing through the tubular valve stem will escape through the port 112, the annular recess 113, the annular channel 120 and ports 123 into the valve chamber thereby building up a back pressure upon the plunger which will force the plunger inwardly, thus compressing the valve spring with a force correlated to the increase of pressure in the cylinder, thus urging the valve toward its seat and restricting the flow of fluid from the port 25. In this construction, as in the others, an aperture 125 is provided in the piston head to prevent excessive pressure from accumulating in the valve chamber.

In Fig. 10 a somewhat simpler form of relief device is shown. The valve 126 is provided with a tubular extension 127 having usual ports telescopically mounted in the port 25 which leads from the cylinder to the reservoir. The valve 126 has a tubular stem 128 with a relatively small passage 129 at its end communicating with a valve chamber 130 which is illustrated as a counterbored extension of the chamber in the plug 131 which is seated in the casing 1. The plug 131 has an extension 132 which provides an extended valve chamber. The plunger in this construction is in the form of a sleeve 133 which is reciprocably mounted in the valve chamber and has a head 134 provided with an extension 135 which slidably fits upon the valve stem 128. An aperture 136 in the head 134 establishes communication between the valve chamber and the reservoir and the helical spring 137 is interposed between the head of the plunger and the head of the valve.

In this construction the extension 132 of the plug 131 is provided with a port 138 which is located at a suitable distance from the normal position of the head of the piston and communicates with the reservoir.

In the operation of the device a sudden movement of the piston, such as the initial movement thereof, will unseat the valve 126 and permit the fluid to flow from the cylinder into the reservoir, but at the same time the fluid will be forced through the tubular valve stem into the valve chamber 130 thereby building up a back pressure behind the head 134 of the piston, thus imposing upon the valve spring an increased pressure in correlation to the increase in pressure in the cylinder. The valve spring will thereby be subject to progressively increasing pressure until the head 134 reaches the port 138, whereupon the fluid will be permitted to escape from the valve chamber into the reservoir and a substantially constant pressure will be maintained upon the valve spring so that upon subsequent increase in pressure the valve will yield against the resistance of its spring until a greater amount of fluid is forced into the valve chamber 130 than can escape through the ports 136 and 138 into the reservoir and thereafter the plunger will again be forced inwardly thus again urging the valve toward closed position and further restricting the flow of fluid from the port 25 in the manner heretofore described.

The device illustrated in Fig. 11 discloses a radically different construction from that heretofore described but within the scope of the invention. In this construction the valve 139 has a tubular extension 140 slidably mounted in the port 25 with the usual outlet ports. The valve, however, is itself enlarged and formed with a preferably cylindrical wall 141 to provide a valve chamber, the outer end portion of which desirably has affixed to it an internal collar 142 which acts for the purpose hereinafter described. The cylindrical wall 141 of the valve is provided at a distance from the head of the valve with a port 143 which leads to the reservoir. A plunger having an enlarged head 144 is reciprocably mounted in the cylindrical portion of the valve 141 which constitutes the valve chamber. The collar 142, which may be secured in an annular recess in the end of the wall 141 of the valve chamber as illustrated, or in any other convenient manner, enables the valve and plunger to be assembled as a unit and also acts to limit the movement of the plunger within the valve casing. The plunger is provided with a stem 145 which is reciprocably mounted in a guideway 146 formed by counterboring the chambered plug 147 which is screwed into the casing. The plunger 144 desirably has a concave or reentrant face 148 which produces a chamber or receptacle and with a counterbore 149 in which is seated a rod or plunger 150 which extends through an aperture 151 in the head 139 of the valve. The rod 150 has at its end an enlarged head 152 which is engaged by a light spring interposed between it and the piston head. The rod 150 thus yieldably mounted will reciprocate in the aperture 151 in the piston head and prevent the stoppage of said passage. A narrow recess or slot or a slight clearance 153 is provided along the plunger head 144 to permit such leakage of the fluid as will prevent too great an accumulation of pressure in the valve chamber. A helical spring 154 is interposed between the plunger head 144 and the end wall of the chamber in the hollow plug 147.

In the operation of this device, like those heretofore described, a sudden movement of the piston will first unseat the valve to permit a relatively free flow of fluid from the cylinder into the reservoir. The fluid, however, will be forced through the port 151 of the piston head into the chamber 148 and as the pressure in this chamber builds up the plunger head will be forced outwardly against the resistance of the spring 154. At the same time the fluid will compress with increased force upon the head of the valve thus urging the valve toward its seat with force correlated to the increase in pressure in the cylinder. This action will continue until the head of the piston has been forced outwardly sufficiently to expose the port 143 at which time the fluid will flow from the valve chamber 148 through the port 143 and maintain a substantially constant pressure upon the valve spring 154 so that upon further increase of pressure in the cylinder the valve will yield against the action of its spring until a greater amount of fluid is forced from the cylinder into the valve chamber than can escape through the port 143 after which the valve will again be urged with progressively increasing force toward seated position as heretofore described.

Figure 12:
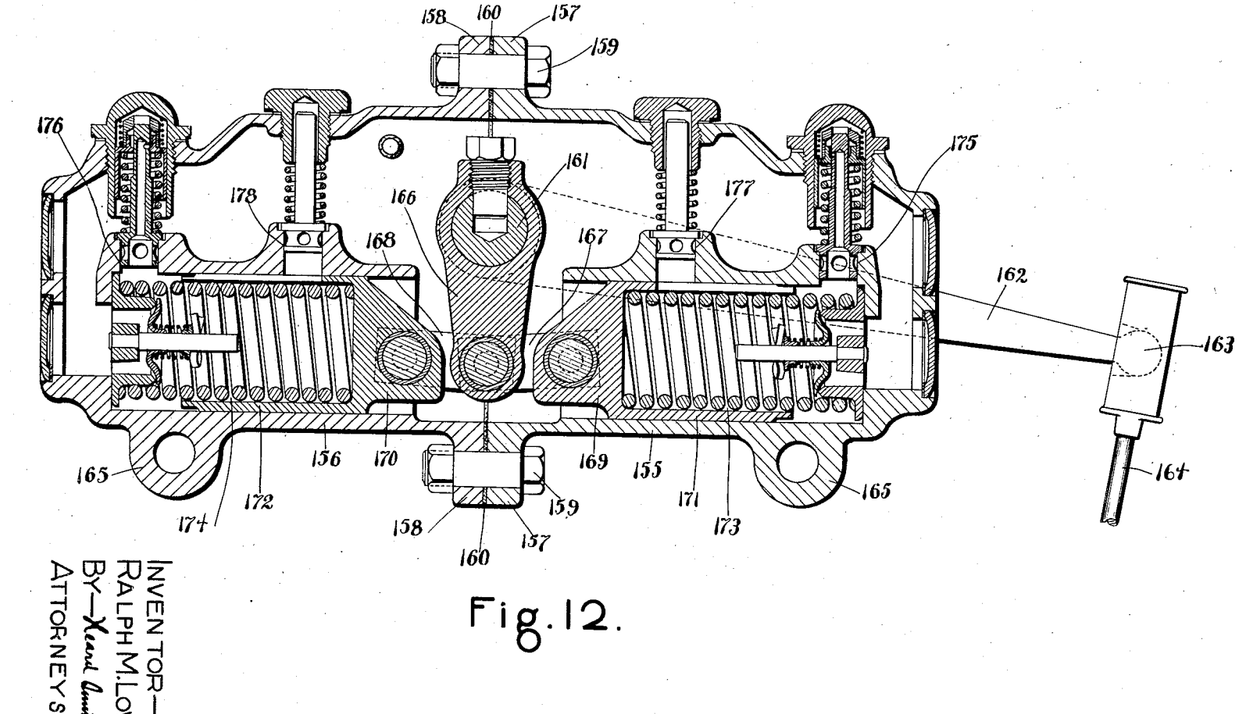

In Fig. 12 a double-acting shock absorber is illustrated which embodies the present invention. In this construction two complementary casings 155 and 156 are employed the open adjacent ends of which have flanges 157 and 158 respectively which are secured together by bolts 159 with a suitable gasket 160 therebetween. The rock shaft 161 is journalled in suitable bearings (not shown) in the sides of the complementary section of the casing and has an outer arm 162 which is connected by a universal joint 163 to a member 164 to one of the relatively movable members, the casing being provided with bosses 165 by means of which it can be secured to the other relatively movable member. The rock shaft 161 has an interior arm 166 which is pivotally connected to links 167 and 168 which in turn are connected to the heads 169 and 170 of hollow pistons 171 and 172. These pistons are reciprocably mounted in cylinders 173 and 174 which are provided with inlet ports and relief ports of the character above described. As illustrated the relief ports 175 and 176 which are adjacent the ends of the respective cylinders are provided with relief valve mechanisms embodying the invention heretofore disclosed, the particular type of relief device illustrated corresponding to that which has previously been described in connection with Fig. 9. Additional relief ports 177 and 178 are shown for the respective cylinders and are provided with relief valves of the type disclosed in my prior patent, but, of course, may be provided with any other suitable type of valve including those embodying the present invention.

The operation of this device is similar to that above described except that the shock absorber cushions the movement of the relatively movable members in each direction instead of in a single direction as in the constructions previously described. The embodiment of the present invention in the double-acting type of shock absorber is particularly important for the reason that a gradual cushioning of the relative movement of the members in either direction is produced without any sudden restriction of the movement which would be felt by the occupants of the vehicle, and if the shock absorber is used in other types of apparatus a similar gradual checking of the movement of the relatively movable members is produced.

It will be understood that various embodiments of the invention disclosed herein are illustrative and not restrictive and that various modifications in form, construction and arrangement of parts may be made within the spirit and scope of the claims.

It is also understood that the invention may be applied to various other uses than that of cushioning relatively movable members within the spirit and scope of the claims.

Having thus described the invention, what is claimed as new, and desired to be secured by Letters Patent, is:

1. A relief device for a chamber containing a fluid which is subject to variations in pressure comprising a valve, a spring positioned to urge said valve toward closed position and means operable by variations in pressure in said chamber to compress said spring against said valve in correlation to the variations in pressure in said chamber.

2. A relief device for a chamber containing a fluid which is subject to variations in pressure comprising a valve, a spring normally positioned to urge said valve toward closed position, means acting to compress said valve spring against said valve with inceasing force correlated to the increase in pressure in said chamber until a predetermined pressure in said chamber is attained and thereafter acting upon said valve spring with substantially constant force whereby said valve spring may yield to further increase in pressure in said chamber.

3. A relief device for a chamber containing a fluid which is subject to variations in pressure comprising a spring actuated valve, a valve chamber, a conduit communicating with said pressure chamber and said valve chamber, means operable by the pressure of the fluid passing through said conduit from said pressure chamber to said valve chamber to compress the valve spring with increasing force correlated to the increase in pressure in said pressure chamber until a predetermined pressure is attained and means operable thereafter to permit such escape of fluid from said valve chamber as will cause the fluid pressure in said valve chamber to act upon said valve spring with a substantially constant force whereby said valve may yield against the action of its spring in response to further increase in fluid pressure in said pressure chamber.

4. A relief device for a chamber containing a fluid which is subject to variations in pressure comprising a valve having a tubular valve stem, a valve chamber enclosing a portion of said valve stem, a plunger reciprocably mounted in said chamber and movable relatively to said valve stem by the pressure of the fluid passing from the pressure chamber to the valve chamber through said tubular valve stem, a spring interposed between said plunger and said valve and means for permitting sufficient fluid to escape from said valve chamber upon compression of said valve spring beyond a predetermined distance to maintain a substantially constant pressure on said valve spring, whereby said valve may thereafter yield against the action of its spring in response to further increase in fluid pressure in said pressure chamber.

5. A relief device for a chamber containing a fluid which is subject to variations in pressure comprising a valve, a spring positioned normally to retain said valve at or adjacent to closed position, means acting to compress said valve spring against said valve with increasing force correlated to the increase in pressure in said chamber until a predetermined pressure in said chamber is attained and thereafter acting upon said valve with a substantially constant force until the valve spring exerts a predetermined resistance and thereupon again acting to force said valve toward closed position.

6. An hydraulic shock absorber comprising a fluid-containing cylinder having a piston reciprocable therein and provided with a relief port, a valve for said port, a spring positioned normally to retain said valve at or adjacent to closed position when the piston is in neutral position and adapted to yield in response to initial compressive movement of the piston and means operable by further compressive movement of said piston to vary the pressure of said valve spring upon said valve in correlation to variations in pressure in said cylinder.

7. An hydraulic shock absorber comprising a fluid-containing cylinder having a piston reciprocable therein and provided with a relief port, a valve for said port, a spring positioned normally to retain said valve at or adjacent to closed position when the piston is in neutral position and adapted to yield in response to initial compressive movement of the piston and means acting upon further compressive movement of said piston to compress said valve spring against said valve until a predetermined pressure in said cylinder is attained and thereafter acting upon said valve spring with substantially constant force, whereby said valve may yield against the resistance of its spring in response to further increase in pressure in said cylinder.

8. An hydraulic shock absorber comprising a fluid-containing cylinder having a piston reciprocable therein and provided with a relief port, a valve for said port, a spring positioned normally to retain said valve at or adjacent to closed position when the piston is in neutral position and adapted to yield in response to initial compressive movement of the piston, a valve chamber, a conduit communicating with said cylinder and valve chamber, a plunger reciprocable in said valve chamber engaging said spring and movable by the fluid flowing through said conduit into said valve chamber to compress said spring with a force correlated to the variations in pressure in said cylinder produced by the movement of said piston.

9. An hydraulic shock absorber comprising a fluid-containing cylinder having a piston reciprocable therein and provided with a relief port, a valve for said port, a spring positioned normally to retain said valve at or adjacent to closed position when the piston is in neutral position and adapted to yield in response to initial compressive movement of the piston, a valve chamber, a conduit communicating with said cylinder and valve chamber, a plunger reciprocable in said valve chamber engaging said spring and movable by the fluid flowing through said conduit into said valve chamber to compress said spring with a force correlated to the variations in pressure in said cylinder produced by the movement of said piston until a predetermined pressure is attained and thereafter acting upon said valve spring with substantially constant force, whereby said valve may yield against the resistance of its spring in response to further increase in pressure in said cylinder.

10. An hydraulic shock absorber comprising a fluid-containing reservoir, a piston reciprocable therein and provided with a relief port communicating with said reservoir, a relief valve for said port, a valve chamber provided with an outlet, a plunger valve in said chamber normally closing said outlet, a conduit communicating with said cylinder and said valve chamber, resilient means interposed between said plunger valve and said relief valve acting normally to urge said relief valve toward closed position, a restricted passage leading from said valve chamber to said reservoir operable to cause the pressure of the fluid flowing from said cylinder to said valve chamber through said conduit to build up pressure upon said plunger valve in correlation to the pressure imposed upon said piston and to move said plunger valve until said outlet is opened and thereafter acting to maintain a substantially constant pressure upon said resilient means, whereby the valve may yield against the action of said resilient means in response to further increase in pressure imposed by the piston upon the fluid in the cylinder.

11. An hydraulic shock absorber comprising a fluid-containing cylinder having a piston reciprocable therein and provided with a relief port, a valve for said port and a multiple spring acting to urge said valve toward closed position.

12. An hydraulic shock absorber comprising a fluid-containing cylinder having a piston reciprocable therein and provided with a relief port, a valve for said port and a multiple spring comprising resilient members arranged to act upon said valve with progressively increasing force in opposition to increasing pressure in said cylinder.

13. An hydraulic shock absorber comprising a fluid-containing cylinder having a piston reciprocable therein and provided with a relief port, a valve for said port and a multiple spring acting upon said valve including a light spring to retain said valve lightly seated when the piston is in normal position and a stronger spring positioned to act upon said valve after the light spring has yielded a predetermined distance.

14. An hydraulic shock absorber comprising a fluid-containing cylinder having a piston reciprocable therein and provided with a relief port, a valve for said port and a plurality of springs of progressively shorter lengths and of progressively increasing strength positioned to act successively upon said valve in response to increasing pressure in said cylinder.

15. An hydraulic shock absorber comprising a fluid-containing cylinder having a piston reciprocable therein and provided with a relief port, a valve for said port, a plurality of springs of progressively shorter lengths and of progressively increasing strength positioned to act successively upon said valve in response to increasing pressure in said cylinder and means operable by the pressure in said cylinder progressively to compress said valve springs in correlation to the pressure in said cylinder until a predetermined pressure is attained and thereafter acting upon said springs with substantially constant pressure, whereby said valve may yield against the pressure of said valve springs in response to further pressure in the cylinder.

16. A shock absorber comprising a fluid-containing reservoir, a cylinder having a plurality of ports communicating with said reservoir at different distances from the head of the cylinder and provided with yieldable relief valves, a tubular piston having an aperture communicating with said ports when the piston is in normal position and during compressive movement of the piston a predetermined distance from normal position, whereby the piston wall will close one of said ports upon further movement of the piston.

17. A shock absorber comprising a fluid-containing reservoir, a cylinder having a plurality of ports communicating with said reservoir at different distances from the head of the cylinder and provided with yieldable relief valves, a tubular piston the wall of which is provided with an aperture communicating with said ports when the piston is in normal position and throughout the suction movement of the piston and so disposed that upon compressive movement of the piston from neutral position the upper port will be closed by said piston wall.

18. A shock absorber comprising a fluid-containing reservoir, a cylinder having a plurality of ports communicating with said reservoir at different distances from the head of the cylinder, a spring-actuated valve for the port farthest remote from the cylinder and means operable by increase in pressure in said cylinder to compress said valve spring upon said valve and thereby urge said valve toward closed position, a spring-actuated relief valve for the port near the head of the cylinder, a tubular piston having a wall provided with an aperture communicating with both ports when the piston is in neutral position and during the suction movement thereof and of such length that upon compressive movement of the piston a predetermined distance the wall of the piston will close the upper port, whereby the escape of fluid from the cylinder upon further compressive movement will be governed by the lower relief valve.

In testimony whereof, I have signed my name to this specification.

RALPH M. LOVEJOY.